(12) United States Patent
Marchant

(10) Patent No.: US 6,690,636 B1
(45) Date of Patent: Feb. 10, 2004

(54) PREFORMATTING OPTICAL RECORDING MEDIUM

(75) Inventor: Alan B. Marchant, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 340 days.

(21) Appl. No.: 09/671,098

(22) Filed: Sep. 27, 2000

(51) Int. Cl.⁷ .................................................. G11B 3/74
(52) U.S. Cl. ........................ 369/97; 369/95; 360/78.02
(58) Field of Search ........................... 369/44.32, 53.19, 369/95, 97, 112.16, 112.17, 112.24, 112.26, 53.14, 93; 360/77.03, 78.11

(56) References Cited

U.S. PATENT DOCUMENTS

| | | | | |
|---|---|---|---|---|
| 4,399,471 A | * | 8/1983 | Preuss .......................... 369/93 |
| 4,884,260 A | | 11/1989 | Bouldin et al. ........... 369/97 X |
| 4,957,580 A | * | 9/1990 | Drexler et al. | |
| 4,970,707 A | * | 11/1990 | Hara et al. ............... 369/44.11 |
| 4,973,832 A | * | 11/1990 | Marchant et al. | |
| 5,459,708 A | * | 10/1995 | Sundaram et al. | |
| 5,802,034 A | * | 9/1998 | Gelbart ....................... 369/102 |
| 5,808,986 A | * | 9/1998 | Jewell et al. .......... 369/112.26 |
| 5,854,780 A | * | 12/1998 | Opheij et al. ............ 369/44.23 |
| 6,084,740 A | * | 7/2000 | Leonhardt et al. ....... 360/77.12 |
| 6,088,319 A | * | 7/2000 | Gudesen ...................... 369/97 |
| 6,429,411 B1 | * | 8/2002 | Iwasaki et al. | |

* cited by examiner

Primary Examiner—Doris H. To
Assistant Examiner—Jorge Ortiz Criado
(74) Attorney, Agent, or Firm—Raymond L. Owens

(57) ABSTRACT

A method for preformatting an optical recording medium with a plurality of parallel guide tracks, each guide track controlling the recording of a band of data tracks; said method includes providing a source laser beam along a predetermined path at a wavelength which is selected to be within the sensitivity range of the optical recording medium and providing a beam splitter in the predetermined path which divides the source laser beam into a multiplicity of preformatted recorded beams directed to impinge upon the optical recording medium. The spacing or pitch between the beams at the optical recording medium is uniform.

15 Claims, 4 Drawing Sheets

PREFORMATTING OPTICAL RECORDING MEDIUM

FIELD OF THE INVENTION

The present invention relates to the fabrication of optical media with preformatted guide tracks for multi-track optical recording.

BACKGROUND OF THE INVENTION

The high capacity of optical recording media is achieved by encoding data in very narrow data tracks, typically about 1 μm wide. A tracking servo system is required to position the tracks so close together without overlap. The tracking servo system functions by sensing guide tracks that are preformatted on the optical recording medium.

The recording data rate of an optical recording system can be greatly increased by multi-track recording, whereby a band of data tracks are recorded simultaneously by a single optical head. The relative positions and parallelism of the tracks within the band are held fixed by optical alignment of recording sources within the head. However, a guide track is still required for each band of data tracks so that the tracking servo system can position data bands close together without overlap.

Existing methods for preformatting optical media are suitable to format optical disk media for single-track recording. However, these preformatting methods are slow and expensive, sometimes dominating the total cost of media manufacturing. Furthermore, these methods are not readily adaptable to create guide track formats for multi-track optical recording.

SUMMARY OF THE INVENTION

It is therefore an object of the present invention to provide a method for flexible, high speed preformatting of optical media for multi-track optical recording and to reduce the cost of optical media fabrication by reducing the complexity of the media preformatting process.

This object is achieved by a method for preformatting an optical recording medium with a plurality of parallel guide tracks, each guide track controlling the recording of a band of data tracks, said method comprising:

a) providing a source laser beam along a predetermined path at a wavelength which is selected to be within the sensitivity range of the optical recording medium;

b) providing a beam splitter in the predetermined path which divides the source laser beam into a multiplicity of preformatted recorded beams directed to impinge upon the optical recording medium, the spacing or pitch between the beams at the optical recording medium being uniform as viewed from a scan direction, such pitch being greater than at least three times the spacing between the data tracks after they are recorded;

c) simultaneously focusing the preformatted recording beams at a focal surface to form an array of focused spots;

d) positioning the optical recording medium with its recording surface at the focal surface; and e) providing relative motion between the optical recording medium and the focused spots in the scan direction to form visible guide tracks in a recording zone of the optical medium that trace out the path of each focused spot.

ADVANTAGES

The present invention has as an advantage that a precise guide track format for multi-track optical recording is formed at a high rate and at low cost. The invention also improves system performance in that reduced guide track runout leads to improved tracking accuracy and increased media capacity.

It is a further advantage of the present invention that it simplifies media manufacturing by allowing high-speed servowriting of the preformat pattern, thereby eliminating the need for specialized surface replication equipment and complex media structures. Servowriting imposes no additional constraints on the media design because it is a laser-marking process similar to data recording. Simplification of the servowriter system is achieved according to the present invention by writing a plurality of guide tracks with a single modulated laser beam.

DETAILED DESCRIPTION OF THE INVENTION

Optical recording media store information in the form of very narrow tracks of data marks. High data density is realized by disposing these data tracks very close together, typically at a track pitch of 1–2 μm. Accurate positioning of the data tracks is accomplished by a closed-loop tracking servo. The tracking servo develops its control signals by optically sensing the positions of preformatted guide tracks on the medium surface. A separate guide track is provided adjacent to each data track, or each band of data tracks for a multi-track recording system. During recording of a data track or a band of data tracks, the tracking servo keeps the optical head registered to the associated guide track.

Figure 1:
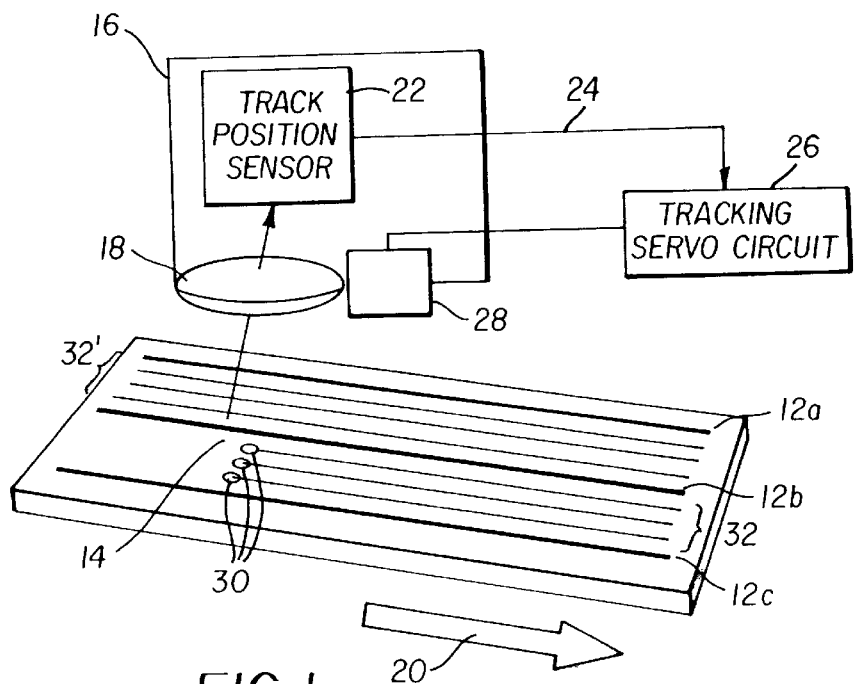
FIG. 1 shows the use of guide tracks to position data bands for multi-track optical recording according to the prior art.

FIG. 1 shows the use of guide tracks to position data bands for multi-track optical recording according to the prior art. An optical recording medium 10 includes preformatted guide tracks 12a–c. An illuminated spot 14 of guide track 12b is illuminated by an optical head 16 through objective lens 18 while the medium is moved relative to the optical head in a scan direction 20 parallel to the guide tracks. A track position sensor 22 in the optical head detects the illuminated guide track and sends a tracking error signal 24 to a tracking servo circuit 26. The tracking servo circuit drives a tracking actuator 28 to move the objective lens so that its cross-track position is held fixed relative to guide track 12b. With the optical head thus stabilized, the optical head focuses a plurality of recording laser beams 30 onto the medium. As the medium continues its scanning motion, the recording laser beams mark the surface, forming a plurality of data tracks 32 all of which run parallel to guide track 12b. In the figure, another band of data tracks, 32', was recorded previously and referenced to guide track 12a.

The guide track pitch must be at least three times the data track pitch so that a plurality of data tracks can be recorded in the intervening unformatted gaps. The guide track pitch must also accommodate any residual cross-track runout of the optical head relative to the preformat pattern so that the data band never runs into an adjacent guide track. By contrast, in the absence of preformatted guide tracks, the pitch between data tracks would have to be much larger to accommodate the open-loop cross-track runout of the optical head relative to the medium. Thus guide tracks increase storage capacity even as they restrict the recordable areas of the medium.

Figure 2:
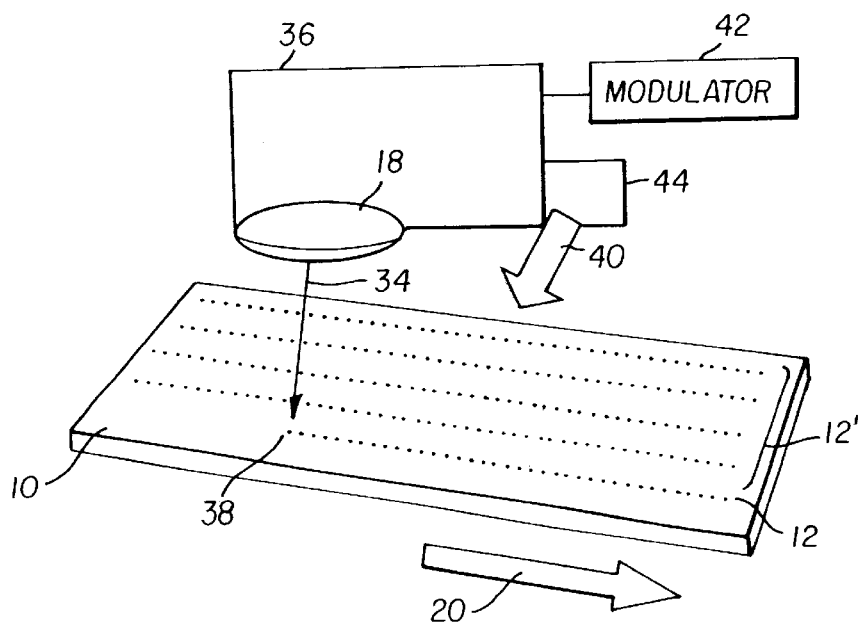
FIG. 2 illustrates a prior art method of creating a guide track using a servowriter.

FIG. 2 illustrates a prior art method of creating guide tracks using a servowriter. A recording beam 34 from a servowriter head 36 is focused by an objective lens 18 to form a focused spot 38 on the featureless surface of an optical recording medium 10. The recording medium is scanned in a direction 20 relative to the focused spot which then marks the surfaces, forming a visible guide track 12. Successive scans of the medium are interspersed with cross-track stepwise motions of the servowriter head in a direction 40 to form a set of parallel guide tracks 12' that cover the recording zone on the surface of the recording medium. The servowriter system can include a modulator 42 that modulates the power in the focused spot, thus creating patterned guide tracks. The servowriter also includes registration means 44 for accurately controlling the cross-track position of the focused spot on the medium and for repositioning the focused spot for formatting of each guide track.

The optical recording medium in FIG. 2 is pictured as an optical card. However, the servowriting method is suitable for preformatting guide tracks in other forms of optical recording media, including optical disk and optical tape.

Figure 3:
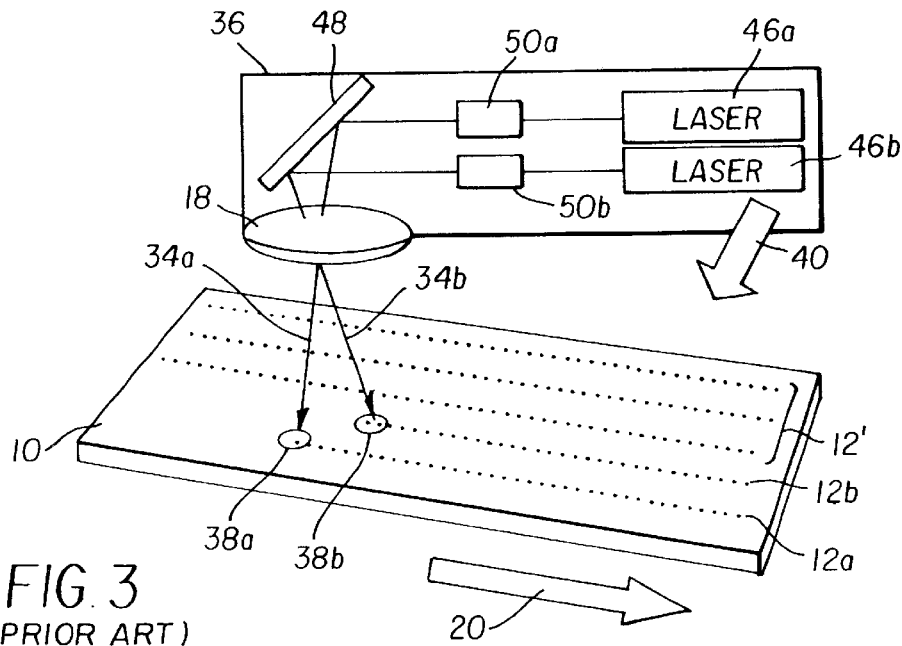
FIG. 3 describes a multi-track servowriter according to the prior art that projects a plurality of record beams through one objective lens.

An important limitation of prior art servowriter systems is that they are slow. It is known in the art that an optical head can project a plurality of record beams through one objective lens to simultaneously record a plurality of tracks. FIG. 3 illustrates a multi-track servowriter that incorporates this principle. Lasers 46a and 46b in the servowriter head form two recording beams, 34a and 34b. The recording beams are directed by mirror 48 to pass through objective lens 18, forming focused spots 38a and 38b on the featureless recording surface of an optical recording medium 10. The recording medium is scanned in a direction 20 relative to the focused spots, simultaneously writing guide tracks 12a and 12b. The recording beams are modulated by modulators 50a and 50b to form patterned guide tracks. Successive scans of the medium are interspersed with cross-track stepwise motions of the servowriter head in a direction 40 with a step size equal to twice the nominal guide track spacing to form a set of parallel guide tracks 12' that cover the surface of the recording medium. Such a servowriter system can preformat the medium faster than a single-spot servowriter. However, it is still limited to formatting a region no wider than the field of view of the objective lens, usually less than 100 μm. Therefore, writing all the necessary guide tracks on a media unit requires multiple servowriter scans.

Established optical disk technology includes methods for embossing or replicating an entire media surface to create a preformat pattern guide tracks and preformat patterns on an entire media surface. For example, substrates for rewritable CD disks area commonly injection molded. However, although precision injection molding or embossing processes are compatible the discrete manufacturing flow for optical disks substrates, these processes are not compatible with continuous production of optical tape or optical card substrates, and their cost per unit area is high.

Photographic exposure has been suggested as a method for preformatting optical tape (see U.S. Pat. No. 4,884,260). Photographic replication can be rapid and accurate. However, this approach requires that expensive photosensitive layers be added to the media. Furthermore, small guide track features, i.e. much smaller than 10 μm, cannot be replicated in a high-speed photographic process.

Figure 4:
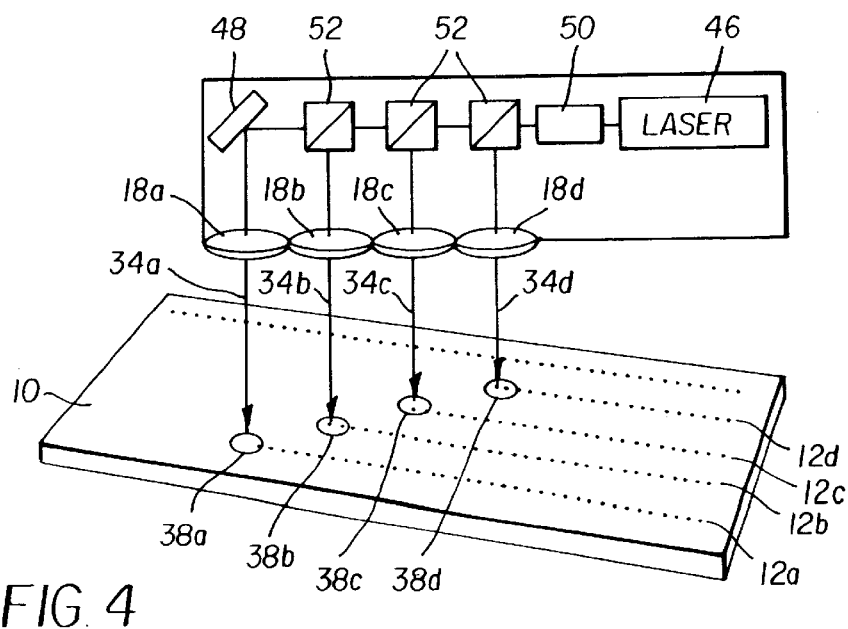
FIG. 4 illustrates multi-track preformatting using a single modulated laser beam according the present invention.

FIG. 4 illustrates multi-track preformatting using a single modulated laser beam according the present invention. The single beam from laser 46 is modulated by modulator 50 and divided by beam splitters 52 to form a plurality of recording beams 34a–d. The recording beams are focused through a plurality of objective lenses 18a–d, forming focused spots 38a–d that are coincident with the featureless recording surface of an optical recording medium. The focused spots simultaneously record a plurality of identical, parallel guide tracks 12a–d across the recording zone of an optical recording medium 10. The width of the preformatted region of the optical recording medium is not limited to the field of view of the objective lenses.

Figure 5:
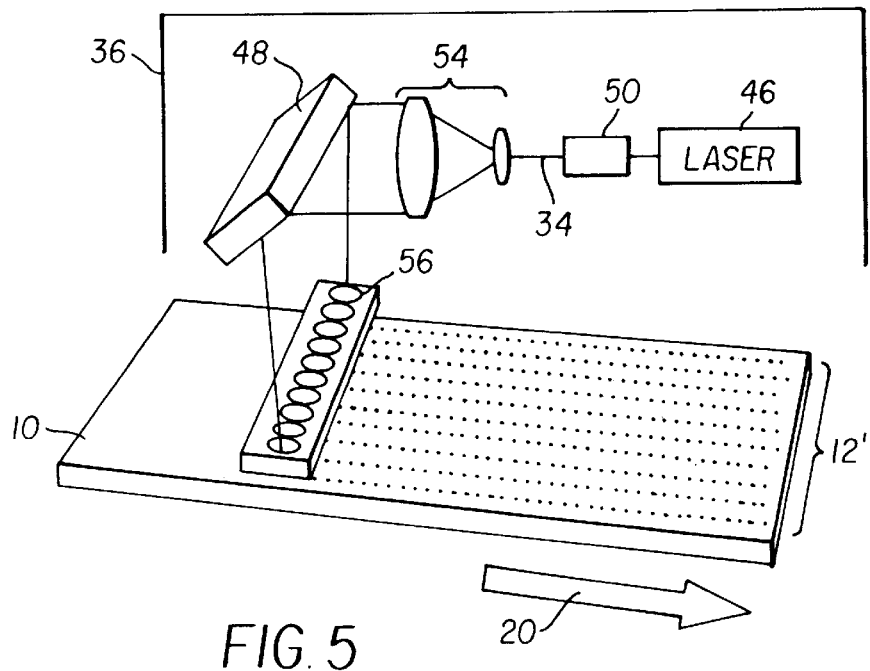
FIG. 5 illustrates another implementation of guide track preformatting according to the present invention.

FIG. 5 illustrates a another implementation of guide track preformatting according to the present invention. In a servowriter head 36, the recording beam 34 from laser 46 is modulated by modulator 50. The recording beam is expanded by an anamorphic beam expander 54 and deflected by mirror 48 to fill a plurality of lenslet elements on a microlens array 56. Each lenslet functions both as a beam splitter, dividing off a part of the recording beam, and as an objective lens, forming a recording spot at the focal plane of the microlens array. An optical recording medium is positioned at the focal plane of the microlens array. As the medium is moved in a scanning direction 20, the servowriter head writes a plurality of identical, parallel guide tracks 12', one for each illuminated element of the microlens array. In this way, an optical medium such as an optical tape can be preformatted in a single pass under the servowriter head forming guide tracks across the entire recording zone if the microlens array is as wide as the medium and includes a lenslet for each of the required guide tracks. FIG. 5 illustrates a microlens array with a linear array of lenslets. It will be appreciated, however, that the microlens elements can be disposed in a two-dimensional array.

Figure 6:
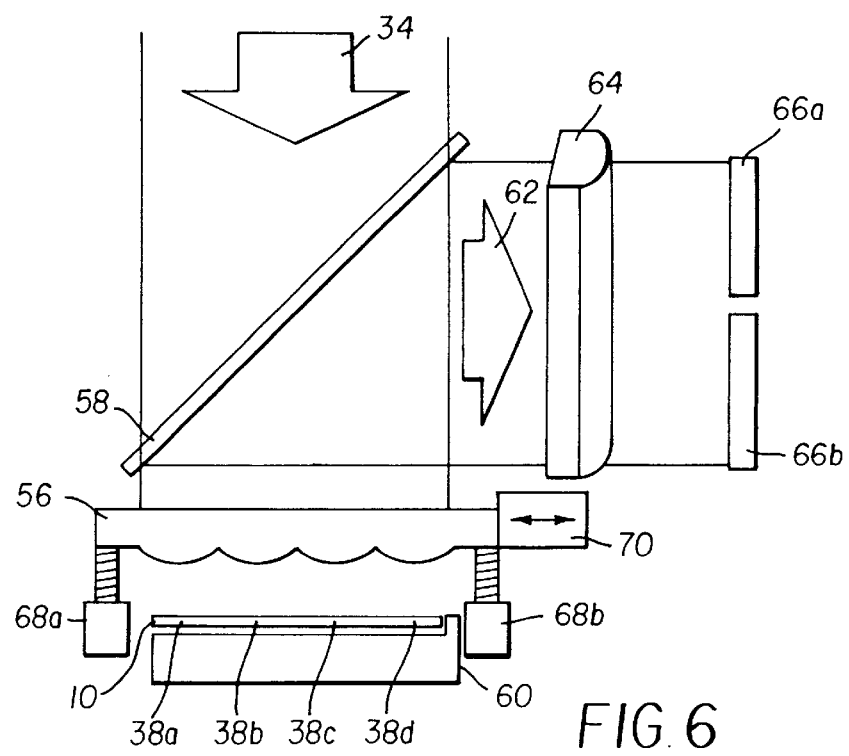
FIG. 6 shows a cross-section of the interface between the servowriter head and a flexible optical recording medium according to the present invention.

FIG. 6 shows a cross-section of the interface between the servowriter head and a flexible optical recording medium according to the present invention. A recording beam 34 passes through a beam splitter 58 to illuminate a microlens array 56 with lenslet elements that divide the beam and focus it to form focused spots 38a–d at a focal surface. The recording surface of a flexible optical recording medium 10 is maintained coincident with the focal surface by a stabilizer 60. The stabilizer can include, for example, a roller, a dynamic air bearing, or a porous pumped air bearing. The stabilizer can also include edge guide features or mechanisms that provide transverse registration of the recording medium.

Light reflected at the surface of the recording medium returns through the microlens elements to form a sensor beam 62 that is deflected by the beam splitter, through a focus sensor lens 64, and onto focus sensors 66a and 66b. A Focus sensor 66a measures the defocus of spots 38a and 38b. Focus sensor 66b measures the defocus of spots 38c and 38d. The difference between error signals from the two offset focus sensors is an indication that the media is tilted relative to the microlens array. Positioning screws 68a and 68b that control the orientation of the microlens array relative to the stabilizer are adjusted to minimize the error signals from focus sensors 66a and 66b, respectively, thus eliminating focus and tilt error at the interface between the medium and the focused spots. If the dynamic runout of the stabilized medium in the vertical direction perpendicular to the recording surface is less than the microlens depth of focus, typically several μm, then adequate focusing can be accomplished by static adjustments without a closed-loop focus system.

The transverse position of guide tracks preformatted on the recording medium depends on the position of the microlens array relative to the medium. An actuator 70 can be provided to dynamically control that relative position by moving the microlens in the transverse direction. Such an actuator can compensate for tape runout, for example if the edge guiding functionality of the stabilizer 60 is imperfect. The actuator can also be used to create guide tracks with a periodic cross-track dither or wobble. In this case, the guide tracks are not straight lines, however the uniform spacing and parallelism of the guide tracks is maintained.

Figure 7:
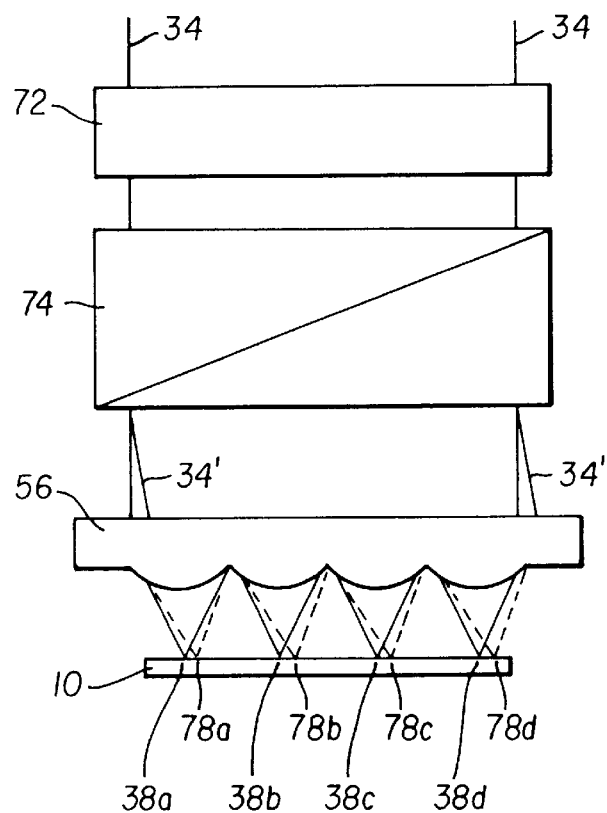
FIG. 7 shows how high frequency guide track dither can be accomplished electro-optically according to the present invention.

It can be desirable to preformat guide tracks with cross-track features of very high spatial frequency. If the objective lenses or media cannot be moved quickly enough, high frequency dither can be effected by deflecting the recording beam. FIG. 7 shows how high frequency guide track dither can be accomplished electro-optically according to the present invention. A polarization modulator 72 switched the recording beam 34 to an orthogonal polarization state. In the switched state, the recording beam is refracted by a birefringent prism 74 to form a deflected recording beam 34' that it illuminates a microlens array 56 at a different incidence angle relative to beam 34. The deflected beam is focused by the elements of the microlens array to form a plurality of focused spots 78a–d that are offset from the undeflected focused spots 38a–d in the transverse direction. The magnitude of the offset is equal to the differential angle of refraction through the birefringent prism multiplied by the focal length of the microlens elements.

Figure 8:
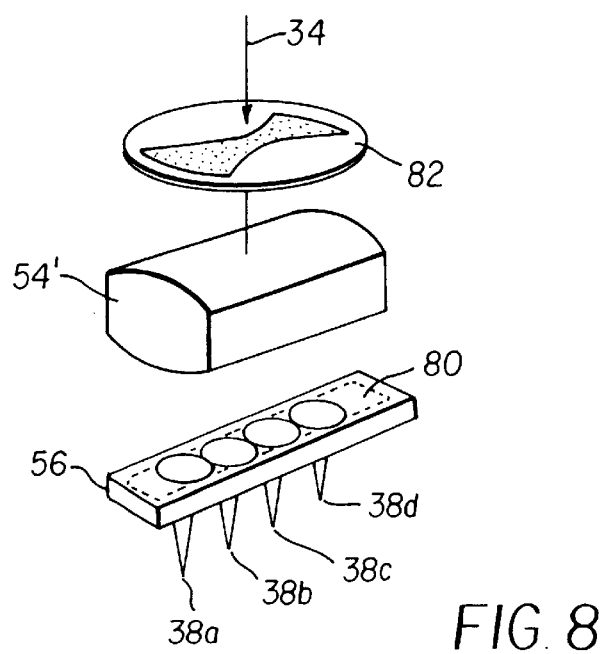
FIG. 8 illustrates how a laser beam shaping can improve guide track uniformity according to the present invention.

FIG. 8 illustrates how a laser beam shaping can improve guide track uniformity according to the present invention. The record beam 34 is converged by a lens 54' to form an illumination pattern 80 on a microlens array 56 which divides the beam and forms a plurality of focused spots 38a–d. The guide tracks written by these focused spots will be identical if the spots have substantially uniform optical power and size. In order for the focused spots to be uniform in power, the total illumination of each of the microlens elements must be the same. And in order for the focused spots to be uniform in size, the illumination pattern should be similar at each microlens element. The recording beam as emitted by a laser usually has a circular Gaussian intensity that would deliver more illumination to lenslets near the center of the optical axis than to those at the edges. The recording beam should be filtered or shaped, for example by an aperture 82, to provide uniform lenslet illumination. Uniform illumination can also be achieved using a variable density filter that transmits more light at the edges than at the center.

The invention has been described in detail with particular reference to certain preferred embodiments thereof, but it will be understood that variations and modifications can be effected within the spirit and scope of the invention.

PARTS LIST 10 optical recording medium
12a–d guide tracks
12' guide tracks
14 illuminated spot
16 optical head
18 objective lens
18a–d objective lenses
20 scan direction
22 track position sensor
24 tracking error signal
26 tracking servo circuit
28 tracking actuator
30 recording laser beams
32 data tracks
32' data tracks
34 recording beam
34' recording beam
34a–d recording beams
36 servowriter head
38 focused spot
38a–d focused spot
40 motion of the servowriter head
42 modulator
44 registration means
46 laser
46a laser

PARTS LIST (con't)

46b laser
48 mirror
50 modulator
50a modulator
50b modulator
52 beam splitters
54 anamorphic beam expander
54' lens
56 microlens array
58 beam splitter
60 stabilizer
62 sensor beam
64 focus sensor lens
66a focus sensor
66b focus sensor
68a positioning screw
68b positioning screw
70 actuator
72 polarization modulator
74 birefringent prism
78a–d focused spots
80 illumination pattern
82 aperture

What is claimed is:

1. A method for preformatting an optical recording medium with a plurality of parallel guide tracks, each guide track controlling the recording of a band of data tracks, said method comprising:

a) providing a source laser beam along a predetermined path at a wavelength which is selected to be within the sensitivity range of the optical recording medium;

b) providing a beam splitter in the predetermined path which divides the source laser beam into a multiplicity of preformat recording beams directed to impinge upon the optical recording medium, the spacing or pitch between the beams at the optical recording medium being uniform as viewed from a scan direction, such pitch being greater than at least three times the spacing between the data tracks after they are recorded;

c) simultaneously focusing the preformatted recording beams at a focal surface to form an array of focused spots;

d) positioning the optical recording medium with its recording surface at the focal surface; and e) providing relative motion between the optical recording medium and the focused spots in the scan direction to form visible guide tracks in a recording zone of the optical medium that trace out the path of each focused spot.

2. The method according to claim 1 wherein optical recording medium is a flexible optical recording tape.

3. The method according to claim 2 further including providing a pumped air bearing on which the optical recording tape is stabilized at the focal surface.

4. The method according to claim 1 further including modulating the amplitude of the source laser beam in accordance with a guide track format.

5. The method according to claim 1 further including modulating the direction of the source laser beam in a plane perpendicular to the scan direction in accordance with crosstrack features of the guide track format.

6. The method according to claim 1 in which the depth of focus of the focused spots is larger than the dynamic runout of the optical recording medium relative to the focal surface whereby focusing of the preformatted recording beams is accomplished without the use of a closed loop focus servo system.

7. The method according to claim 1 in which the recording medium is an optical tape and wherein the visible guide tracks are simultaneously preformatted across the entire recording zone.

8. The method according to claim 1 in which the beam splitter includes a microlens array which divides the source laser beam into the multiplicity of preformatted recorded beams and also provides the focusing function of step c).

9. The method according to claim 5 wherein modulation of the direction of the source laser beam is provided by an electro-optical modulator and a birefringent prism.

10. The method according to claim 8 further including moving the microlens array in a direction transverse to the scan direction to compensate for transverse runout of the optical medium or to impart a nonlinear pattern to the parallel guide tracks.

11. The method according to claim 1 further including sensing the position of a focus spot relative to the medium surface to determine a corresponding focus error.

12. The method according to claim 1 further including sensing the focus error by at least two independent focus sensors to determine the tilt of the optical recording medium relative to the focal surface.

13. The method according to claim 8 further including adjusting the illumination of the microlens elements so that the focused spots have substantially uniform optical power and size.

14. The method according to claim 13 in which an aperture shapes the source laser beam to adjust the illumination of the microlens elements.

15. An optical tape preformatted according to the method of claim 1.

* * * * *